United States Patent [19]
Harkness

[11] 3,782,084
[45] Jan. 1, 1974

[54] SAFE START SYSTEM FOR RIDING MOWERS

[75] Inventor: Joseph R. Harkness, Germantown, Wis.

[73] Assignee: Briggs & Stratton Corporation, Wauwatosa, Wis.

[22] Filed: Nov. 1, 1972

[21] Appl. No.: 302,871

[52] U.S. Cl............... 56/10.5, 56/DIG. 15, 123/179
[51] Int. Cl............................................ A01d 75/18
[58] Field of Search............. 56/10.2, 10.5, DIG. 15; 123/179; 73/493

[56] References Cited
UNITED STATES PATENTS

| | | | |
|---|---|---|---|
| 3,736,729 | 6/1973 | Peterson | 56/10.5 |
| 3,733,794 | 5/1973 | Allen | 56/10.5 |
| 3,731,471 | 5/1973 | Bening | 56/10.5 |
| 2,616,682 | 11/1952 | Greenhut | 73/493 |

*Primary Examiner*—Antonio F. Guida
*Attorney*—Ira Milton Jones

[57] ABSTRACT

A safe start interlock between the ignition system of the engine of a riding mower prevents starting of the engine while either the transmission through which the engine drives the traction wheels or the clutch connecting the engine with the mower is "in gear," wherein a centrifugally responsive switch with considerable inherent hysteresis is built into the engine to keep the engine ignition system grounded until a relatively high engine speed is reached, and upon being opened to disrupt the grounding circuit, remains open despite a substantial reduction in engine speed.

2 Claims, 4 Drawing Figures

PATENTED JAN 1 1974　　　　　　　　　　　　　　3,782,084

SAFE START SYSTEM FOR RIDING MOWERS

This invention relates to internal combustion engine powered riding mowers and garden tractors used to propel and drive a wide variety of implements, and refers more particularly to means for preventing the starting of the engine when the machine or a part thereof is "in gear."

The present invention is therefore concerned with the same problem that motivated the inventions of the Santi et al. Pat. No. 3,521,612 and the Miley et al. Pat. No. 3,626,676; but provides a better way of solving that problem.

More especially it is the purpose of this invention to provide an interlock between the engine ignition system and the manually operable controls through which the traction wheels and power driven implements are drivingly connected with the engine, that is more reliable and positive in its assurance against starting of the engine when to do so would be dangerous. It achieves that objective through the provision of a centrifugally responsive switch in the circuitry of the interlock, which is built into the engine and has appreciable inherent hysteresis.

With these observations and objectives in mind, the manner in which the invention achieves its purpose will be appreciated from the following description and the accompanying drawing, which exemplifies the invention, it being understood that changes may be made in the specific apparatus disclosed herein without departing from the essentials of the invention set forth in the appended claims.

The accompanying drawing illustrates two complete examples of the embodiment of the invention constructed according to the best modes so far devised for the practical application of the principles thereof, and in which.

Figure 1:
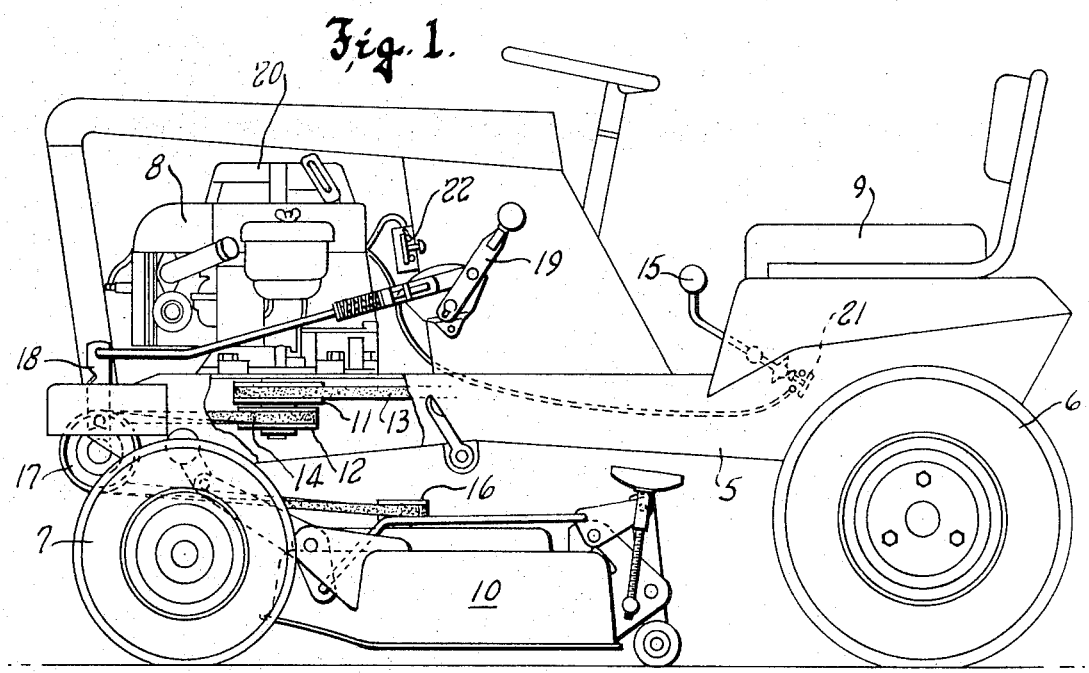
FIG. 1 is a side view of a riding type power lawn mower driven by a vertical shaft engine and equipped with the interlock of this invention.

Referring to the drawing, the numeral 5 indicates the chassis of a riding type power lawn mower, which as is customary, has rear traction wheels 6 and steerable front wheels 7. A single cylinder vertical shaft internal combustion engine 8, mounted on the chassis in front of the driver's seat 9 provides power to drive the traction wheels and the rotor (not shown) of a rotary lawn mower 10 which is located beneath the chassis of the machine.

A pair of pulleys 11 and 12 is fixed to the bottom power takeoff end of the engine crank shaft, the former having a belt 13 trained over it to transmit power to the traction wheels through a transmission (not shown) and the latter having a belt 14 trained over it to carry engine power to the blade (not shown) of the rotary mower. The transmission has the usual control lever 15 which is shiftable from a neutral out-of-gear position to any of at least two operative or in-gear positions, and since the customary clutch (also not shown) is normally engaged, the traction wheels will be drivingly connected with the engine whenever the lever 15 is in any position other than neutral.

Engine power is transmitted to the mower by tensioning the belt 14 which connects the pulley 12 with a pulley 16 on the mower drive shaft. For this purpose idler pulleys 17, over which the belt 14 passes, are mounted on a pivoted lever 18 to be moved to and from belt tensioning position by a manually operable control lever 19. As will be evident, a pull on the lever 19 to bring it to its operative position, tensions the belt 14 and drivingly connects the mower with the engine.

It should be understood that the riding mower illustrated, as well as the manner in which its traction wheels and the rotary blade (or blades) of the mower are drivingly connected with the engine, is but illustrative of the type of machine with which the invention is concerned, the important thing being that the machine has at least two manually operable control members, one governing the transmission of engine power to the traction wheels and the other governing the transmission of engine power to the mower, neither of which should be in operative position at the time the engine is started. The safety hazard of being able to start the engine while one of these controls is in gear is self evident, especially where the engine is started by a pull on the rope of a rewind type engine starter 20 as distinguished from an electric starter which can be activated while the operator is seated on the machine.

With this invention, as with that of the aforesaid Miley et al patent, the interlock has an ignition system grounding circuit that is closed when either of the two manually operable control members is in its operative position and the engine is not running. Thus there is a switch 21 operatively associated with the gear shift lever 15 to be closed whenever the lever is in one of its "operative" positions, and open when the lever is in its neutral position; and another switch 22 which is closed whenever the belt tensioning lever 19 is pulled back to its operative position as in FIG. 1, to drivingly connect the mower with the engine, and opened when the lever is pushed forward to disconnect the mower drive.

Figures 3, 4:
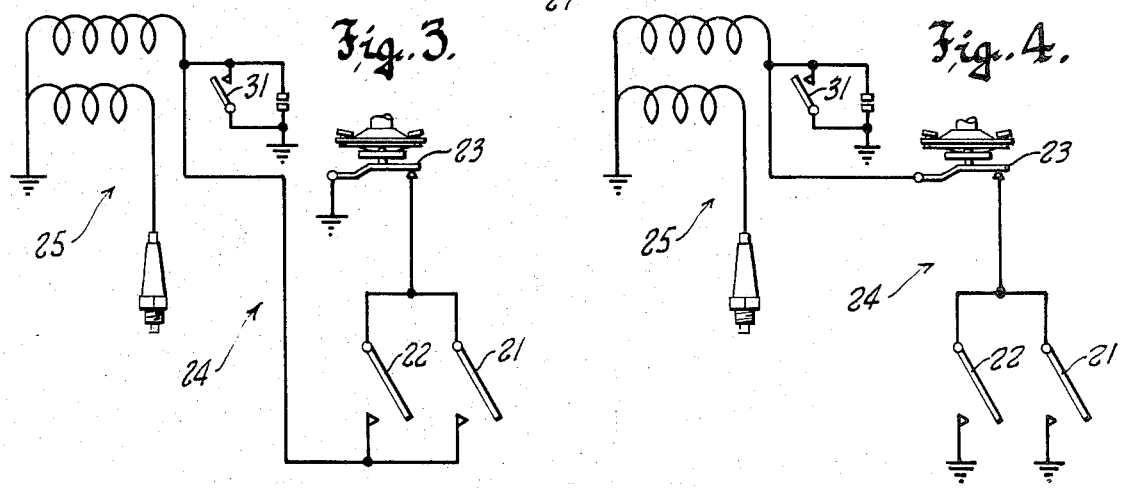
FIG. 3 is a diagram illustrating the preferred electrical circuitry of the interlock.
FIG. 4 diagrammatically illustrates a modification of that circuitry.

As shown in FIGS. 3 and 4, the two switches 21 and 22 are connected in parallel with one another and in series with an engine condition responsive switch 23. Electric circuitry, designated generally by the numeral 24 in FIGS. 3 and 4, is connected with the engine ignition system 25 to ground the same when the switch 23 is closed and either of the switches 21, 22 is closed. With the ignition system grounded, it is of course impossible to start the engine. To this extent the present invention follows the Miley et al. patent, but because of the nature of the switch 23, and its embodiment in the engine, the resulting combination achieves a significantly improved safe start interlock not contemplated or suggested by the Miley et al. patent.

In the Miley et al. patent the engine condition responsive switch is held open by retraction of the starting rope and closes with initial outward movement of the rope. It is conceivable, therefore, that the engine could be started even though one of the manually operable controls was in its in-gear condition. This could happen if a strong man spun the engine with a sharp pull on the starter rope and then either intentionally or accidentally let go of the rope. If that happened, the engine condition responsive switch would be re-opened to disrupt the ignition grounding circuit while the engine was still turning over fast enough to start.

The interlock of the Miley et al. patent thus lacks the reliability and dependable safety expected of it. By contrast, with this invention the engine condition responsive switch 23 will not open until the engine is turning over at a rate much faster than even a strong man can crank it if one of the two manual control members is in its operative in-gear position connecting the engine with the mower or the traction wheels.

Furthermore, as will be shown hereinafter, the engine condition switch 23, upon being opened in response to the high centrifugal force needed to open it, will remain open despite a very significant drop in engine speed; even to a relatively slow idling speed.

These desirable attributes are attained through use of a centrifugally responsive switch having high inherent hysteresis. One such switch is disclosed in the Greenhut Pat. No. 2,616,682. In the adaptation of that switch to this invention, a base plate 26 (FIG. 2) fixed to the crankshaft 27 of the engine, has an actuator in the form of a flexible skeletal normally concave-convex spring ring 28 fixed thereto to rotate with the crankshaft. As its speed of rotation increases, the rising centrifugal force acting on a plurality of weights 29 that are fixed to the ring 28, tends to flatten the ring and upon attainment of a predetermined speed, twists the portions of the ring to which the weights are attached and causes the ring to snap into a relatively flattened condition. That response of the spring ring moves a contactor controlling member 30 axially of the crankshaft to a position allowing the switch 23 to open. Since it requires far greater force to bring about the aforesaid response than it does to maintain the ring 28 in its relatively flattened condition, the speed of engine rotation can drop considerably before the mechanism will restore itself to its initial state and in so doing, reclose the switch 23.

Since reference can be had to the aforesaid Greenhut patent for the details of the centrifugally responsive switch actuator, further description thereof here is deemed unnecessary.

It should be observed though that this type of centrifugally responsive switch actuator lends itself to considerable adjustment of its switch opening and closing parameters. For purposes of illustration, the actuator can be designed to resist switch opening response until rotation as high as 1,300 to 1,500 rpm is reached, and then hold the switch open until the speed of rotation has dropped to as low as 600 to 800 rpm. It is possible, therefore, to tailor the response of the switch 23 to assure that the engine cannot possibly be started while either of the two manually operable control members is in its in-gear condition.

Figure 2:
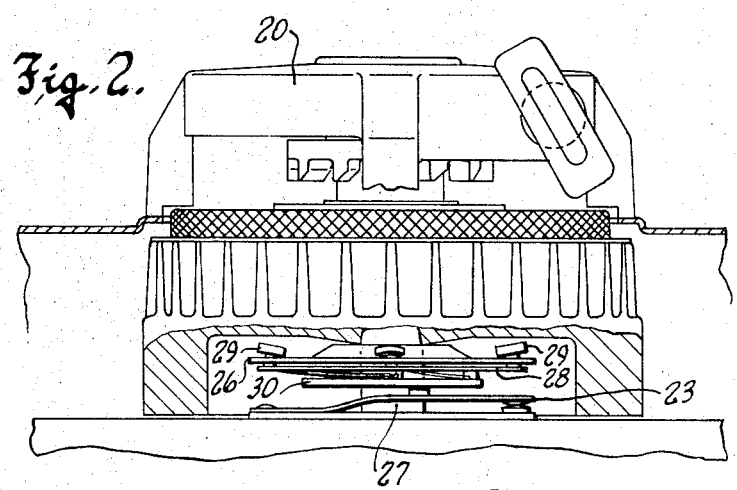
FIG. 2 is a side view of the upper portion of the engine, more especially its flywheel and rewind rope starter mechanism, with parts broken away and in section.

In addition, the use of a centrifugally responsive switch as distinguished from an engine condition responsive switch that is controlled by the position of the pull rope handle as in the Miley et al patent, has the advantage of enabling the switch to be built into the engine and so located that it will be effectively housed against the deleterious effects of dirt and grass accumulation which could prevent opening of a switch by the pull rope handle. An especially effective protection for the switch is obtained by locating it within the flywheel as shown in FIG. 2.

From the standpoint of gaining the greatest assurance that a good ground connection will be had, the circuitry of FIG. 3 is preferred over that of FIG. 4. In the former, it is the engine manufacturer who makes the ground connection since it is one of the terminals of the engine mounted switch 23 which is grounded, whereas in the FIG. 4 circuitry, the ground connection must be made by the equipment manufacturer under conditions often not conducive to the attainment of a reliably good electrical connection. On the other hand, the FIG. 4 circuitry requires but a single wire to connect the engine mounted switch 23 and the ignition system with the two control responsive switches 21–22, whereas in FIG. 3 two wires are required for this purpose.

In each of the two circuits, a manually operable grounding switch 31 is provided to stop the engine.

Those skilled in the art will appreciate that the invention can be embodied in forms other than as herein disclosed for purposes of illustration.

The invention is defined by the following claims:

1. In combination, a riding type vehicle having traction wheels, an internal combustion engine having a flywheel on its crankshaft shaped to provide a cavity between it and the adjacent wall of the engine, the engine also having an ignition system, transmission means including a manually operable control member movable to an operative position in which it effects a driving connection between the engine and the traction wheels, and safe-start means for grounding the ignition system of the engine to keep the engine from starting if it is cranked while said control member is in an operative position, said safe-start means comprising:

an ignition system grounding circuit including
1. a first switch operatively connected with said control member to be closed when the control member is in an operative position and open when the control member is not in an operative position,
2. a second switch in series with the first switch so that both switches must be closed to close the grounding circuit, and
3. centrifugally responsive instrumentalities to maintain said second switch closed when the engine is not running and open when the engine is running at above predetermined rpm, said centrifugally responsive instrumentalities being located in the cavity of the flywheel and having an actuator drivingly connected with the crankshaft of the engine to rotate directly therewith and to respond to engine speed, the actuator of said centrifugally responsive instrumentalities having considerable inherent hysteresis so that opening of the switch does not occur until a predetermined high engine speed is reached, but when opened remains open despite a substantial reduction in engine speed.

2. The combination of claim 1, further characterized by a work-performing implement connected with the vehicle to move therewith and having instrumentalities that must be power driven; means for drivingly connecting said instrumentalities with the engine including a manually operable control member movable to an operative position effecting driving connection between the engine and said instrumentalities; and a third switch operatively associated with said last named control member to be closed when said control member is in its operative position and open when the control member is not in its operative position, said first and third switches being connected in parallel in the ignition grounding circuit.

* * * * *